United States Patent [19]

Shalvi

[11] Patent Number: 5,148,411
[45] Date of Patent: Sep. 15, 1992

[54] DISTANCE MEASUREMENT DEVICE

[75] Inventor: Ram Shalvi, Hong Kong, Hong Kong

[73] Assignee: Solar Wide Industrial Ltd., Hong Kong

[21] Appl. No.: 679,979

[22] Filed: Apr. 1, 1991

[30] Foreign Application Priority Data

Jun. 2, 1989 [GB] United Kingdom ............... 8912643

[51] Int. Cl.⁵ ............................................. G01S 15/00
[52] U.S. Cl. .................................... 367/108; 367/910
[58] Field of Search ............... 367/910, 108; 364/564, 364/561

[56] References Cited

U.S. PATENT DOCUMENTS

| 4,297,701 | 10/1981 | Henriques | 364/561 |
| 4,464,738 | 8/1984 | Czajkowski | 367/108 |
| 4,730,190 | 3/1988 | Win et al. | 367/910 |

FOREIGN PATENT DOCUMENTS 2153998 8/1985 United Kingdom .

OTHER PUBLICATIONS

Exact Electronics Dimensional Measurement Computer, 1987.

*Primary Examiner*—Daniel T. Pihulic
*Attorney, Agent, or Firm*—Larson and Taylor

[57] ABSTRACT

A distance measuring device including a casing bearing a visual display and incorporating therein a transmitter for directing signals toward a selected surface; a receiver for detecting echoes from the selected surface; distance calculating circuitry for measuring the distance to a selected surface in accordance with the transit time of the signal; visually displaying the calculated distance; memory for storing at least two displayed distances measured in perpendicular directions; multiplication circuitry for multiplying the stored measurements; and visually displaying the product of the multiplication. The device further includes a key to effect the operation of the device whereby a distance is displayed, another key to initiate the storage of a displayed distance; and a key to initiate the multiplication of the stored distance measurements.

6 Claims, 3 Drawing Sheets

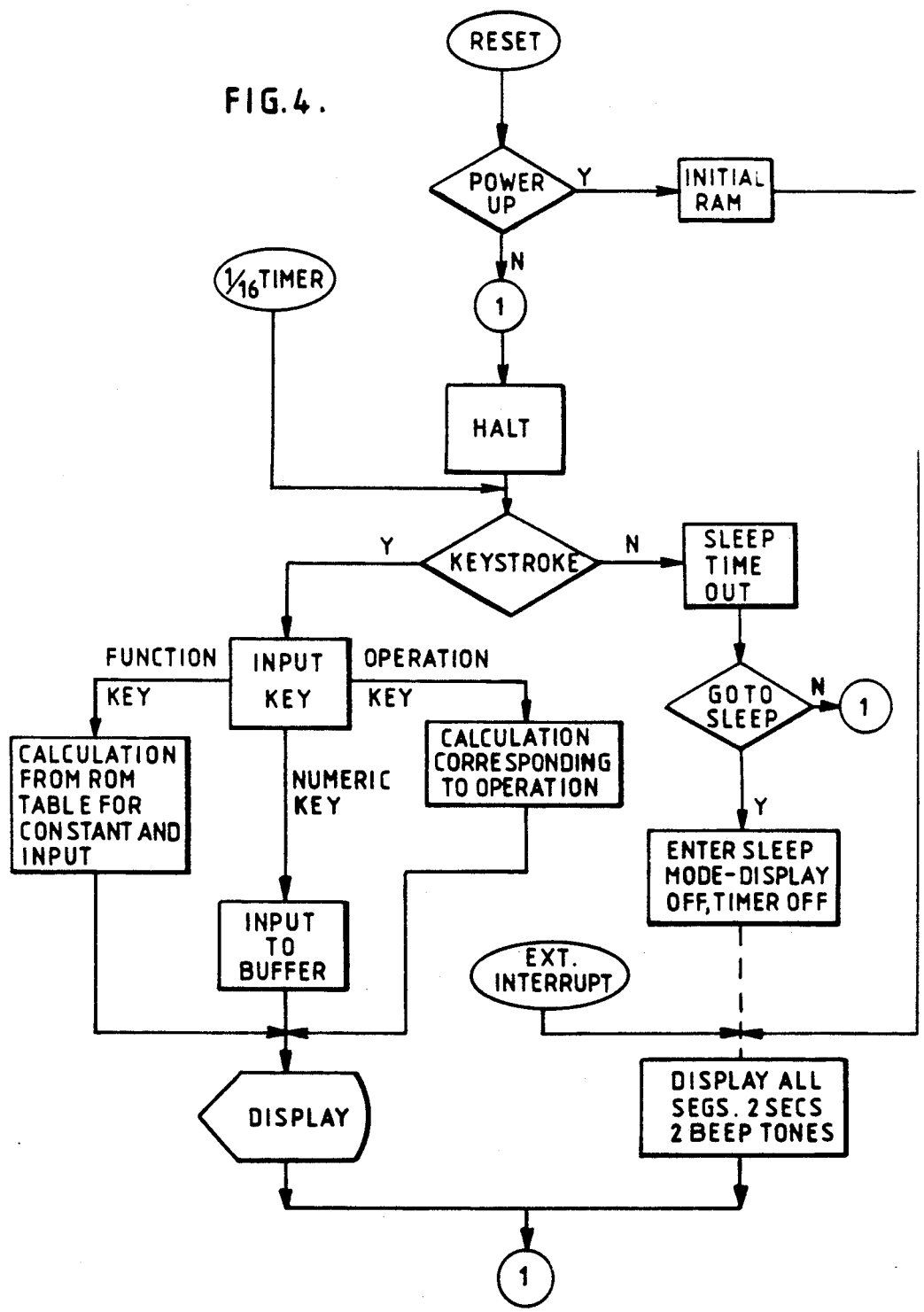

DISTANCE MEASUREMENT DEVICE

The present invention relates to a distance measuring device.

Distance measurement devices which operate by remote sensing are well known. Typically they use ultrasonic waves to measure the distance from the device to a remote object, such as the far wall of a room. It is known to provide a facility on such devices for automatically computing the floor area or volume of a room from the measured dimensions.

According to the present invention there is provided a distance measuring device including a casing incorporating therein a transducer for transmitting and directing signals externally of the casing towards a selected surface and for receiving the signals reflected from the selected surface, circuit means for monitoring the transmission of the signals and the receipt thereof arranged to provide a distance output signal dependent upon the time that elapses between transmission and receipt of the signals from the selected surface, means for storing the distance output signals corresponding to at least two distances to respective surfaces in at least two planes at right angles to one another, one or more manually operable function keys on the casing, function circuit means connected to said function keys arranged to apply resective algorithms to the at least two distance output signals and arranged to drive a first visual display mounted on the casing to display directly the results of the distance output signals in terms of each respective function.

The transducer may be an ultra-sonce transducer.

The distance measuring device may include a generally conventional electronic calculator mounted in the casing, associated with a visual display, arranged to receive the distance output signals, in which the calculator is arranged to be manually controlled to add, subtract, multiple and divide the distance output signals in a normal way to provide a computed calculation signal based thereon, and in which each function key is operable to supply the computed calculation signal to said function circuit means.

The first visual display and the display associated with the calculator may comprise a single display.

The distance measuring device may include at least four different function keys and preferably eight or more.

The function keys and function circuit means may be arranged to apply algorithms to produce displays of results based on area and volume measurements.

By providing an electronic calculator on the device, the user can readily calculate quantities which are dependent on a measured distance, area or volume, such as, for example, the amount of paint or wallpaper needed to decorate the room.

Preferably, the measured values are input directly to the calculator.

Other preferred features and advantages will be apparent from the following description and the accompanying claims.

The invention will be further described by way of example with reference to the accompanying drawings.

BRIEF DESCRIPTION OF THE DRAWINGS

FIG. 4 is a flow chart describing the operation of the calculator of the device of FIGS. 1 to 3.

Figure 1:
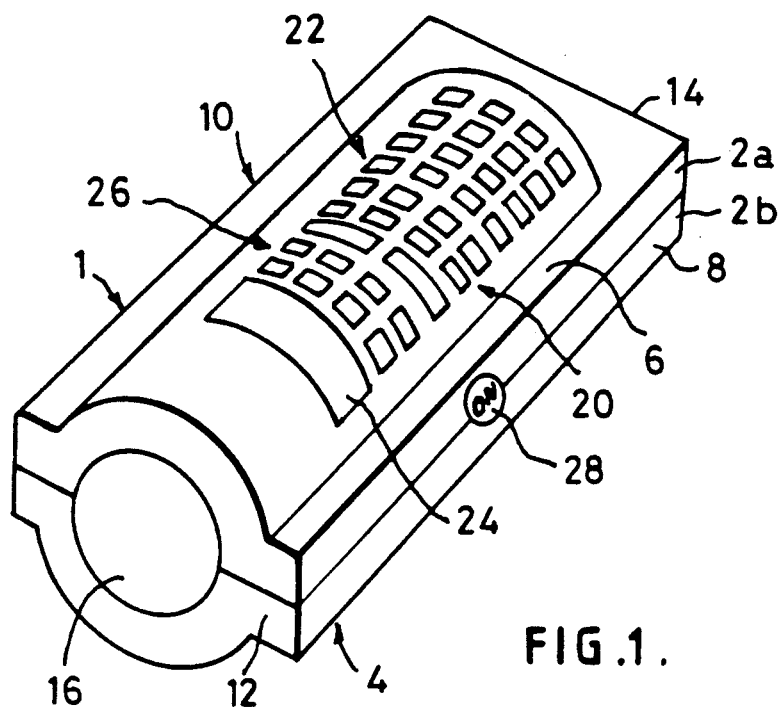
FIG. 1 is a perspective view of a distance measurement device forming an embodiment of the invention.
Figure 2:
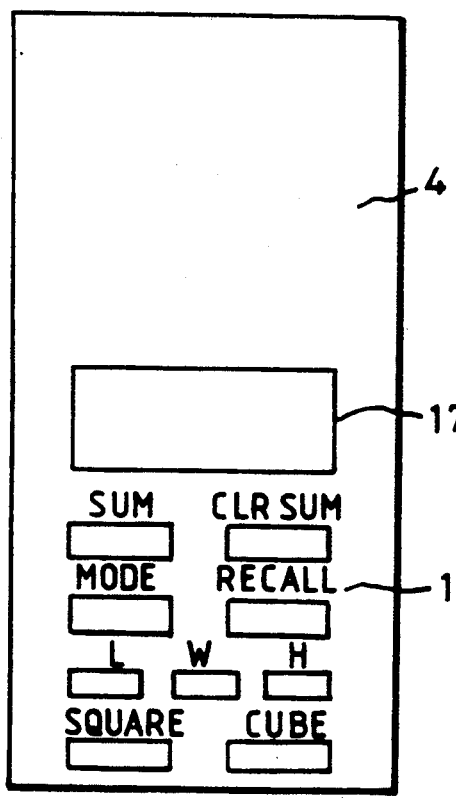
FIG. 2 is a rear view of the device of FIG. 1.
Figure 3:
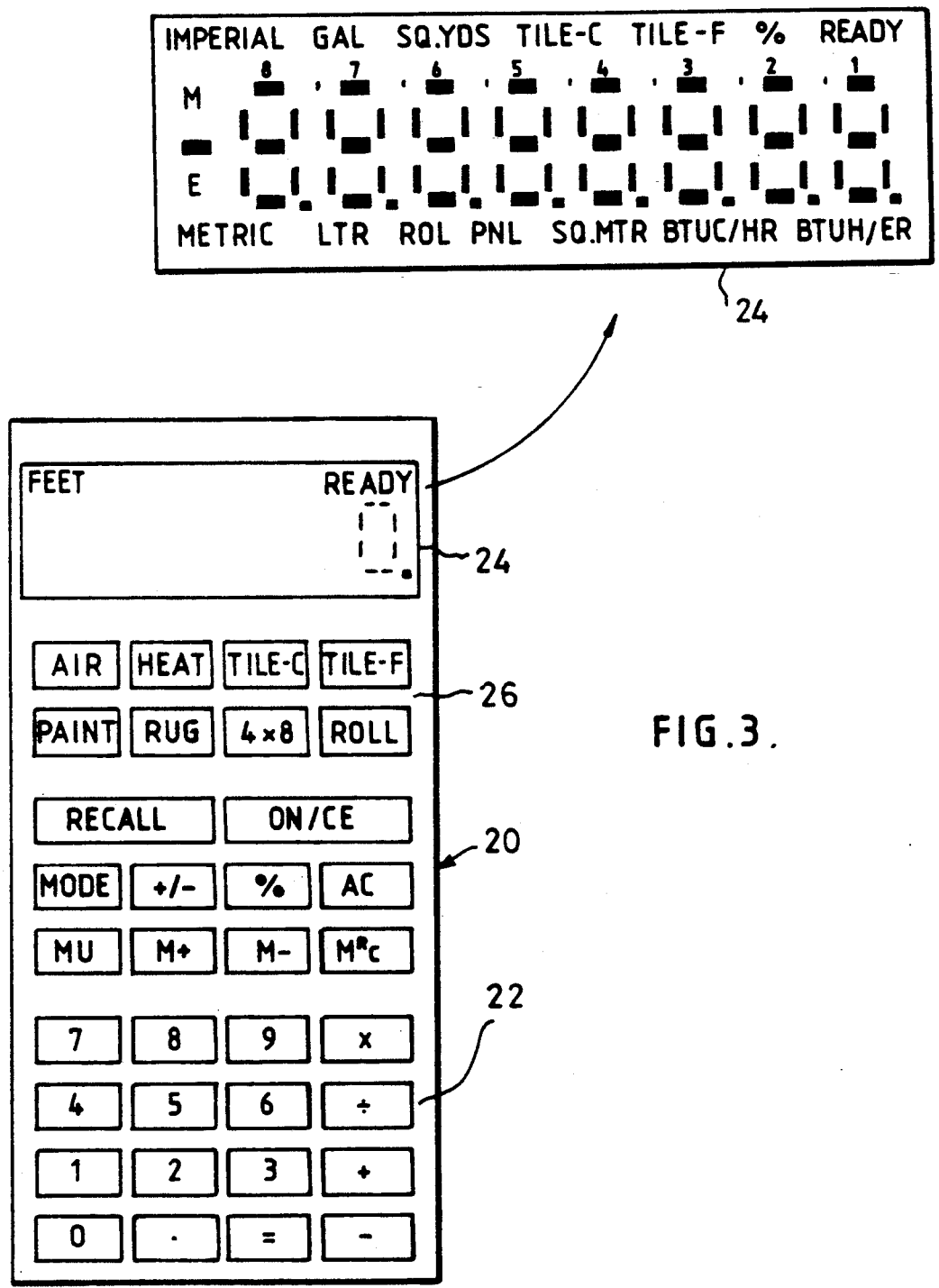
FIG. 3 shows in more detail a calculator keyboard of the device of FIG. 1.

Referring to the drawings, a distance measurement device 1 in accordance with the invention comprises a plastics casing 2 having two halves 2a, 2b bonded or screwed together. The casing 2 has front and rear faces 4, 6, side walls 8, 10, a top wall 12 and a bottom wall 14.

At the top wall 12 transducer means 16 is positioned for transmitting an ultrasonic signal and detecting the signal reflected from a distant object. The time elapsed between the transmission and detection of the reflected signal is measured by electronic circuitry (not shown) and used to estimate the distance of the object. Typically, the device will operate with acceptable accuracy over a range of 0.6 m to 10 m.

The device is operated by an on board battery power supply.

The front face 4 carries a liquid crystal display 17 and a keyboard 18. The keyboard has buttons labelled SUM, CLR SUM, MODE, RECALL, L, W, H, SQUARE and CUBE. The display displays the measured distance in imperial (feet and inches) or metric (meters) units and the units displayed are toggled between by pressing the mode key.

To measure distance the 'ON' button 28 on the side 8 is pressed. All digits in the display 17 are momentarily illuminated and then the measured distance calculated from the bottom wall 14 to the object is displayed. The displayed measurement is then stored as Length (L), Width (W) or Height (H) by depressing the appropriate button. This will replace any reading previously stored. Depressing the 'SQUARE' key will cause the area (L×W) to be displayed, and depressing the 'CUBE' key will cause the volume (L×W×H) to be displayed.

The 'SUM' key can be used to sum two consecutive measurements and the 'CLR SUM' to clear the stored sum. Pressing 'RECALL' will recall the last displayed figure.

The distance measurement device 1 is provided on its rear face 6 with a calculator 20. Calculator 20 comprises a keyboard 22 and liquid crystal display 24.

The keyboard 22 includes key inputs for numerals 0 to 9, arithmetic operations +, −, ×, ÷=, decimal point, ± toggle, %, AC (all clear), ON/CE (turn on from sleep mode, or cancel entry in operating mode), M+, M− (add or subtract displayed value from memory), $M^Rc$ (memory recall and clear) and MU (markup).

The operations performed on actuation of these keys are standard, the mark-up operation being as follows:

100 [MU] 20 [%] giving 125 (100/(1−20%))

125 [−] 100 [MU] giving 20% (((125−100)/125) 100%)

A RECALL key wakes up the calculator and causes the last displayed value to be displayed. The MODE key toggles between imperial and metric units.

The upper bank of keys 26 is for performing predetermined functions. The functions are chosen to suit a particular trade, in this example the building or decorating trade. The keys operate as follows on the displayed figure.

AIR: calculates the amount of cooling required for a room, and hence the initially displayed figure should be the room volume HEAT: calculates the amount of heating required for a room TILE C: calculates the number of ceiling tiles required, and hence the area (L×W) should be the initially displayed figure TILE F: calculates the number of floor tiles PAINT: calculates the volume of paint required RUG: calculates the area of carpet or the like required 4×8: calculates the number of panels required ROLL: calculates the number of rolls of wallpaper required Preferable algorithms for the above calculations are as follows:

|  |  |  | UNIT ANNUNCIATORS | |
|---|---|---|---|---|
| | | [[IMPERIAL MODE]] | | |
| [AIR] | ROUND | $((4300 + [(INP/8) - 100] \cdot 13.5), 0)$ | BTU/HR | BTUC/HR |
| [HEAT] | ROUND | $((INP \cdot 3.92495), 0)$ | BTU/HR | BTUH/HR |
| [TILE-C] | ROUND | $((INP - 8), 2)$ | TILES | TILE-C |
| [TILE-F] | ROUND | $((INP \cdot 1.44), 2)$ | TILES | TILE-F |
| [PAINT] | QUARTER | $((INP - 300))$ | GALLON | GAL |
| [RUG] | ROUND | $((INP - 9), 2)$ | SQ. YARDS | SQ. YDS |
| [4 × 8] | ROUND | $((INP - 32), 2)$ | PANEL | PNL |
| [ROLL] | ROUND | $((INP - 57), 2)$ | ROLL | ROL |
| | | [[METRIC MODE]] | | |
| [AIR] | ROUND | $((4300 + [(INP \cdot 4.405655) - 100] \cdot 13.5), 0)$ | BTU/HR | BTUC/HR |
| [HEAT] | ROUND | $((INP \cdot 138.33569), 0)$ | BTU/HR | BTUH/HR |
| [TILE-C] | ROUND | $((INP \cdot 1.3437248), 2)$ | TILES | TILE-C |
| [TILE-F] | ROUND | $((INP \cdot 100), 2)$ | TILES | TILE-F |
| [PAINT] | QUARTER | $((INP - 6.1335165))$ | LITERS | LTR |
| [RUG] | ROUND | $((INP), 2)$ | SQ. METER | SQ. MTR |
| [4 × 8] | ROUND | $((INP - 2.9768), 2)$ | PANEL | PNL |
| [ROLL] | ROUND | $((INP - 5.302425), 2)$ | ROLL | ROL |

REMARKS: INP stands for the input value.
[TILE-C] stands for CEILING TILE.
[TILE-F] stands for FLOOR TILE.

The algorithms assume, inter alia, that a floor tile is 10 inches square (imperial) or 10 cm square (metric), a ceiling tile is 2 ft.×4 ft., a gallon of paint covers 300 sq.ft., a roll of wallpaper covers 57 sq.ft., and a panel is 8×4 feet.

The values are round to n decimal places, where n is defined in ROUND ($exp^N$, n), or to the nearest higher QUARTER, e.g. 123.1 becomes 123.25.

Cooling load estimation is calculated according to $$BTU/Hr = 4,300 + [((SPACE/8) - 100) \cdot 13.5]$$

where SPACE is the volume in cubic feet and it assumes a room height of 8 ft.

In the device as described, the measured or calculated values on display 17 are input manually to the calculator 20 via keyboard 22. However, means may be provided for automatically transferring the values on display 17 to the memory registers or buffer of the calculator 20. The arrangement may be such that once the length, width, and height have been input, via keyboard 18, the values are input automatically to a buffer or memory store of the calculator 20, whence they can be operated on by means of the function keys 26. Hence the calculator 20 need not include the numeric input keys or arithmetic operation keys, however these are currently desirable for general use. Also the displays 17 and 24 may be one and the same display, the keyboards being on the same face of the housing.

The calculator has a sleep function which operates if there is no keystroke for 120 seconds. The operation of the calculator is outlined in the flowchart, FIG. 4.

An on-off switch, not shown, is provided to switch the device, including calculator 20, on and off.

A common chip or processor may be used for the calculator 20 and keyboard 18.

Various other modifications may be made to the described embodiment and it is desired to include all such modifications as fall within the scope of the accompanying claims. The distance measuring devices according to the invention can be tailored to suit different trades. This enables carpet estimater to simply measure an area, taking two distance readings in planes at right angles and reading either the no. of rolls required, or the price of the carpeting directly and so on. A constant or a factor facility may be added to any function to automatically adjust the displayed output. For example to price dark paint to be applied to a light wall will require a factor to increase the paint required, air conditioning in a warmer climate will require more capacity, etc. Such factors may be "built in" to the function or available to add under extra manual control.

I claim:

1. A distance measuring device including:

a casing bearing a visual display and incorporating therein: a transducer for transmitting and directing signals externally of the casing towards a selected surface; first means for receiving the signals reflected from the selected surface; second, circuit means for measuring distance to such a selected surface by monitoring the transmission of the signals and receipt thereof and determining the distance to the selected surface in accordance with time elapsed between transmission and receipt of such signals; third means for displaying the calculated distance; fourth means for storing at least two such displayed distances measured at right angles to each other, and fifth means for effecting multiplication of stored measurements and displaying the product; and the device further comprising manually operable keys on the casing, the keys including: a key for effecting operation of the first, second and third means whereby a distance is measured and displayed; at least one further key for effecting operation of the fourth means whereby a displayed distance measurement is stored; and at least further one key for effecting operation of the fifth means whereby multiplication of stored measurements is effected and the product is displayed.

2. A distance measuring device including:

a casing bearing a visual display and incorporating therein:

a transducer for transmitting and directing signals externally of the casing towards a selected surface; first means for receiving the signals reflected from the selected surface; second, circuit means for measuring distance to such a selected surface by monitoring the transmission of the signals and receipt thereof and determining the distance to the selected surface in accordance with time elapsed between transmission and receipt of such signals; third means for displaying the calculated distance; fourth means for storing at least two such displayed distances measured at right angles to each other; and fifth means for effecting multiplication of stored measurements and displaying the product; and the device further comprising manually operable keys on the casing, the keys including: a key for effecting operation of the first, second and third means whereby a distance is measured and displayed; keys, corresponding respectively to measurements of length, width and height, for effecting operation of the fourth means whereby displayed distance measurements of length, width and height are stored; and at least one further one key for effecting operation of the fifth means whereby multiplication of stored measurements is effected and the product is displayed.

3. A distance measuring device according to claim 1 wherein the at least one key for effecting operation of the fifth means comprise a key for effecting multiplication of the last two stored measurements whereby the displayed product is an area and a key for effecting multiplication of the last three stored distance measurement whereby the displayed product is a volume.

4. A distance measuring device according to claim 1 wherein the transducer is an ultra-sonic transducer.

5. A distance measuring device according to claim 1 wherein the casing is provided with a generally conventional electronic calculator, associated with a visual display, arranged for input of values displayed on the first-mentioned display by the third or fourth means in which the calculator is arranged to be manually controlled selectively to add, subtract, multiply and divide such values to provide a computed value based thereon, and in which each function key is operable to display the computed value on the second-mentioned visual display.

6. A distance measuring device according to claim 5, in which the first-mentioned visual display and the second-mentioned display comprise a single display.

* * * * *